(12) United States Patent
Uryu et al.

(10) Patent No.: US 9,429,230 B2
(45) Date of Patent: Aug. 30, 2016

(54) RANGE CHANGE DEVICE

(71) Applicant: Mitsubishi Electric Corporation, Tokyo (JP)

(72) Inventors: Takuya Uryu, Tokyo (JP); Kazuhisa Kurita, Tokyo (JP); Yoshiki Saiki, Tokyo (JP); Chiaki Sugano, Tokyo (JP); Masayuki Aota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/725,743

(22) Filed: May 29, 2015

(65) Prior Publication Data

US 2016/0109022 A1    Apr. 21, 2016

(30) Foreign Application Priority Data

Oct. 17, 2014 (JP) ................................. 2014-212208

(51) Int. Cl.
*F16H 63/34* (2006.01)
*F16H 61/32* (2006.01)
*F16H 37/06* (2006.01)
*F16H 61/12* (2010.01)

(52) U.S. Cl.
CPC ............ *F16H 61/32* (2013.01); *F16H 37/065* (2013.01); *F16H 61/12* (2013.01); *F16H 63/3458* (2013.01); *F16H 2061/122* (2013.01); *F16H 2061/1292* (2013.01); *F16H 2061/326* (2013.01)

(58) Field of Classification Search
CPC ................. F16H 2061/326; F16H 2061/1292; F16H 2061/122
See application file for complete search history.

(56) References Cited

U.S. PATENT DOCUMENTS

| 3,225,626 | A | * | 12/1965 | Geyer | .............................. 74/661 |
| 6,461,265 | B1 | * | 10/2002 | Graham | ................. F16H 3/724 475/5 |
| 2002/0045506 | A1 | * | 4/2002 | Scheuerer | ............... F16H 61/12 475/5 |
| 2003/0221499 | A1 | * | 12/2003 | Wong | ...................... F16H 59/08 74/335 |
| 2006/0163025 | A1 | * | 7/2006 | Hori | ........................ F16H 61/24 192/219.5 |
| 2008/0173121 | A1 | | 7/2008 | Kimura et al. | |
| 2008/0223640 | A1 | * | 9/2008 | Clauson | ................. B60K 6/365 180/69.6 |
| 2009/0108791 | A1 | * | 4/2009 | Isobe | ...................... F16H 61/32 318/561 |
| 2013/0139632 | A1 | * | 6/2013 | Rake | ....................... F16H 59/08 74/473.3 |
| 2013/0305865 | A1 | * | 11/2013 | Howe | ..................... F16H 61/12 74/473.12 |

FOREIGN PATENT DOCUMENTS

JP          2008-180250 A       8/2008

* cited by examiner

*Primary Examiner* — Sherry Estremsky
*Assistant Examiner* — Lillian Nguyen
(74) *Attorney, Agent, or Firm* — Sughrue Mion, PLLC

(57) ABSTRACT

Provided is a range change device which includes a main motor and an auxiliary motor, a sun gear which is joined to a motor shaft of the main motor, an auxiliary gear which is joined to a motor shaft of the auxiliary motor, a plurality of planetary gears which are engaged with the sun gear, an annular gear in which internal teeth engaged with the planetary gears and external teeth engaged with the auxiliary gear are formed, a carrier which supports the planetary gears in a state where the carrier allows the planetary gears to rotate and revolve and is rotatable on an external circumference of the motor shaft, a small gear which is mounted on the carrier and rotates about an axis of the motor shaft, and a large gear which is engaged with the small gear.

4 Claims, 4 Drawing Sheets

RANGE CHANGE DEVICE

BACKGROUND OF THE INVENTION

1. Field of the Invention

The present invention relates to a range change device of a shift-by-wire system which changes a shift range of an automatic transmission of a vehicle through an electric signal.

2. Description of the Related Art

In recent years, a shift-by-wire system which changes a shift range of an automatic transmission of a vehicle through an electric signal, in accordance with instructions of a driver of the vehicle, has been applied to a vehicle control. It is necessary for a vehicle to be reliably stopped and towed even when failure occurs due to some factor. In the case of a vehicle of the related art, in which a shift-by-wire system is not used, a shift range of an automatic transmission is changed to a P range or a parking brake is operated, in such a manner that the vehicle can be stopped. Furthermore, the shift range of the automatic transmission is changed from the P range to other ranges, in such a manner that it is also possible to easily perform towing of the vehicle.

However, in a case of a vehicle to which a shift-by-wire system is applied, a shift range of an automatic transmission is electrically changed. Accordingly, when failure, such as exhaustion of a battery or disconnection in wiring, occurs in a power source or a power supply system, it is difficult to change the shift range of the automatic transmission. Thus, even the vehicle including the shift-by-wire system requires a range change device which can change the shift range of the automatic transmission when failure occurs in the vehicle due to some factor.

In a shift-by-wire device (in other words, an SBW device) disclosed in JP-2008-180250A, a capacitor is provided to store power supplied to range control means, as a method of changing a shift range of an automatic transmission when failure occurs in a power supply system. Thus, even when failure occurs in a battery or a power supply system, an actuator of the SBW device can allow the shift range of the automatic transmission to be changed to the "P range" at least once, using the power stored in the capacitor. As a result, the vehicle is safely and reliably stopped.

Furthermore, a lever is operated, in such a manner that the shift range of the automatic transmission is manually released from a "P range". As a result, the vehicle in a parked state can be easily moved by, for example, traction.

The SBW device of the related art is a countermeasure in which it is assumed that, when power is not supplied due to, for example, failure in the power supply system, the actuator changes the shift range to the P range using power stored in the capacitor. However, when failure occurs due to a voltage reduction in the power source, the actuator of the SBW device of the related art does not normally operate, and thus there is a problem in that the shift range cannot be changed.

SUMMARY OF THE INVENTION

The present invention is made to solve the problem described above. An object of the present invention is to provide a range change device which can change a shift range even when a voltage reduction resulting in an abnormal operation of an actuator occurs.

According to an aspect of the invention, there is provided a range change device which includes a main motor and an auxiliary motor, a sun gear which is joined to a motor shaft of the main motor, an auxiliary gear which is joined to a motor shaft of the auxiliary motor, a plurality of planetary gears which are engaged with the sun gear and are arranged on a circumference of the sun gear at equal intervals, an annular gear in which internal teeth engaged with the planetary gears and external teeth engaged with the auxiliary gear are formed, a carrier which supports the planetary gears in a state where the carrier allows the planetary gears to rotate and revolve and is held in a state where the carrier is rotationally slid on an external circumference of the motor shaft of the main motor, a small gear which is mounted on the carrier on a surface opposite to a surface on which the planetary gears are mounted and rotates about an axis of the motor shaft of the main motor, and a large gear which is engaged with the small gear. Furthermore, a shift range of an automatic transmission is changed by rotation of the large gear.

According to the range change device of the present invention, an auxiliary motor is mounted to perform a shift-range change at the time of a reduction in supply voltage. Thus, the following effect can be obtained. First, even when supply voltage is reduced, the shift range can be changed by the auxiliary motor. In addition, when the supply voltage is recovered, the shift-range changing operation by the auxiliary motor can be switched to a normal shift-range changing operation by the main motor.

The foregoing and other objects, features, aspects and advantages of the present invention will become more apparent from the following detailed description of the present invention when taken in conjunction with the accompanying drawings.

DETAILED DESCRIPTION OF THE INVENTION

Hereinafter, details of a range change device according to embodiments of the present invention will be described with reference to FIGS. 1 to 4.

Embodiment 1

Figure 1:
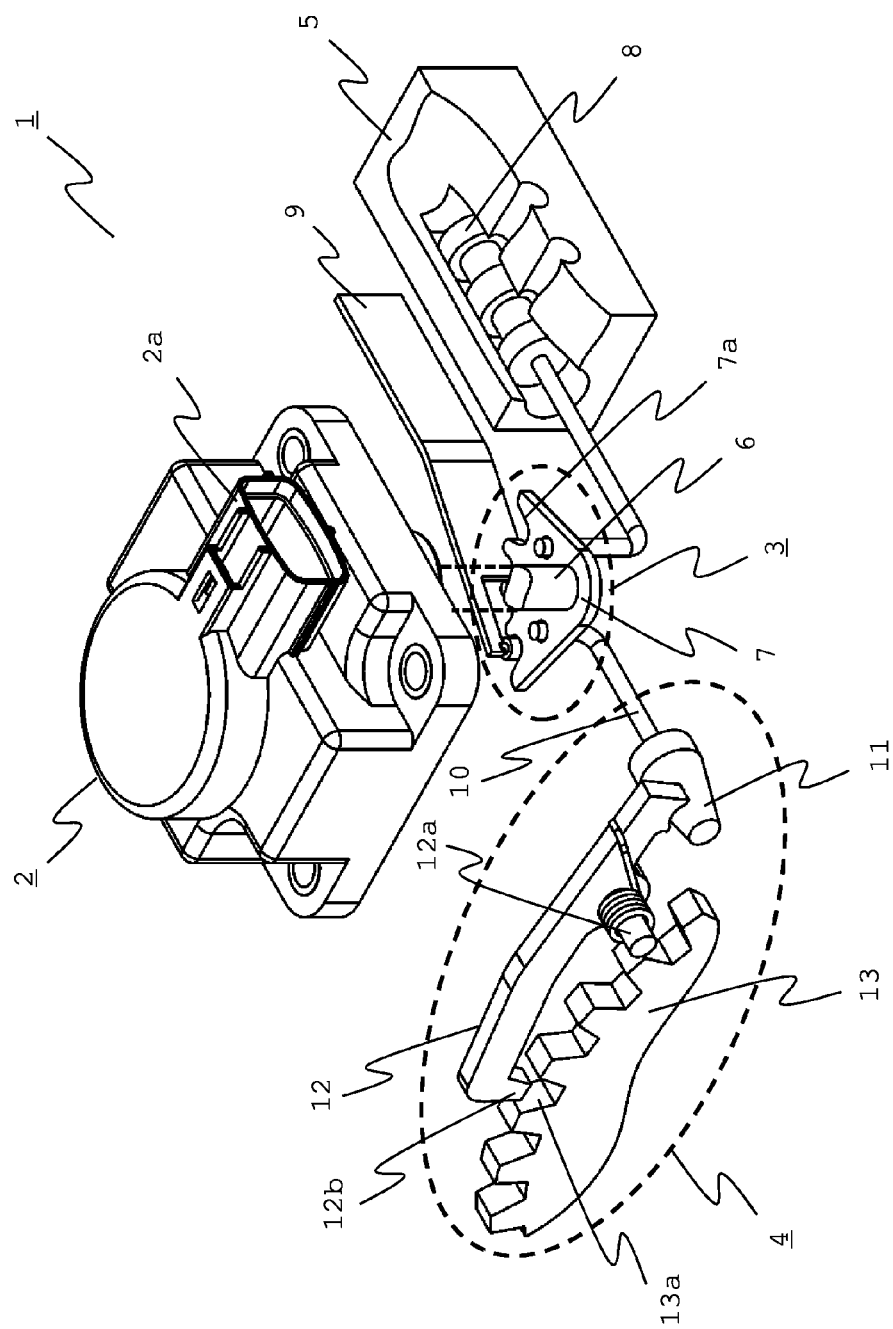
FIG. 1 is a perspective view illustrating a configuration of the entirety of a shift range changing system including a range change device according to an embodiment 1.
Figure 2:
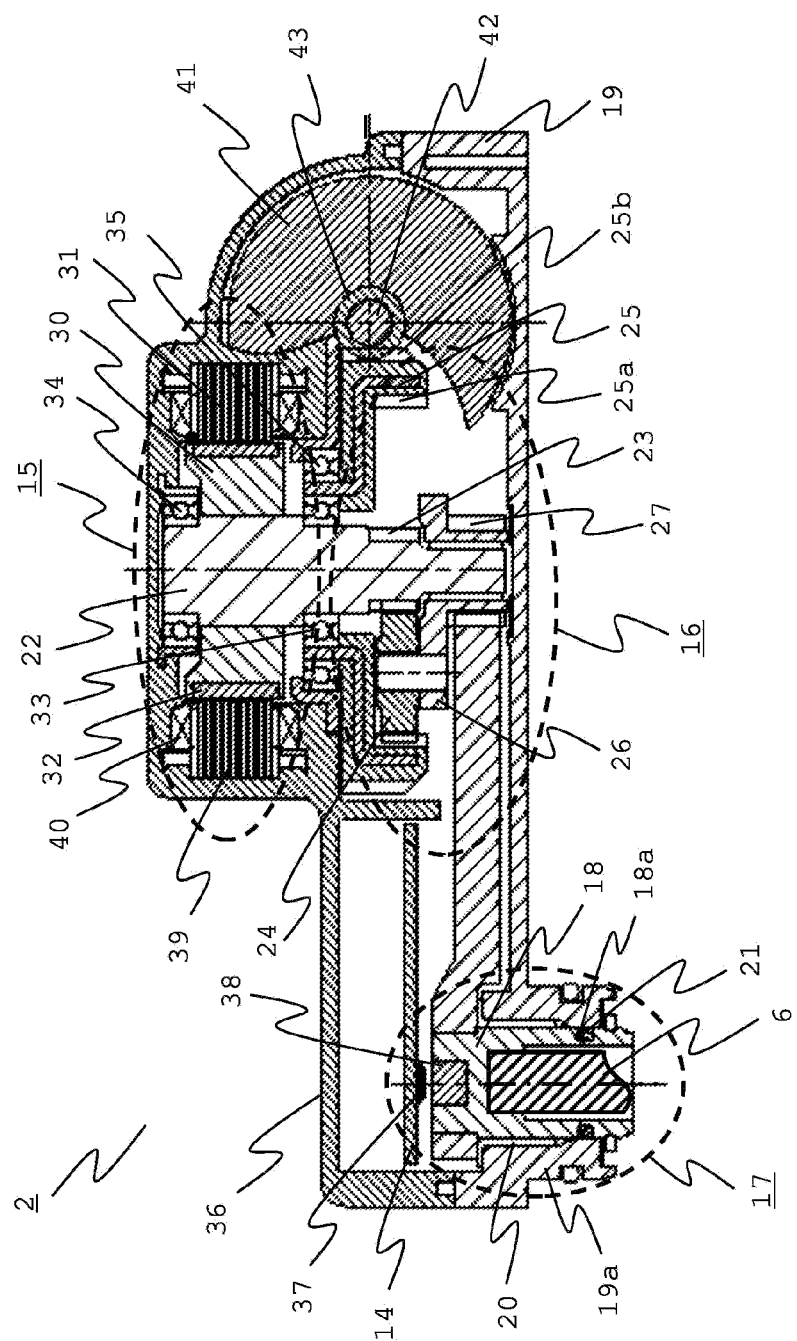
FIG. 2 is a lateral cross-sectional view of the range change device according to the embodiment 1.
Figure 3:
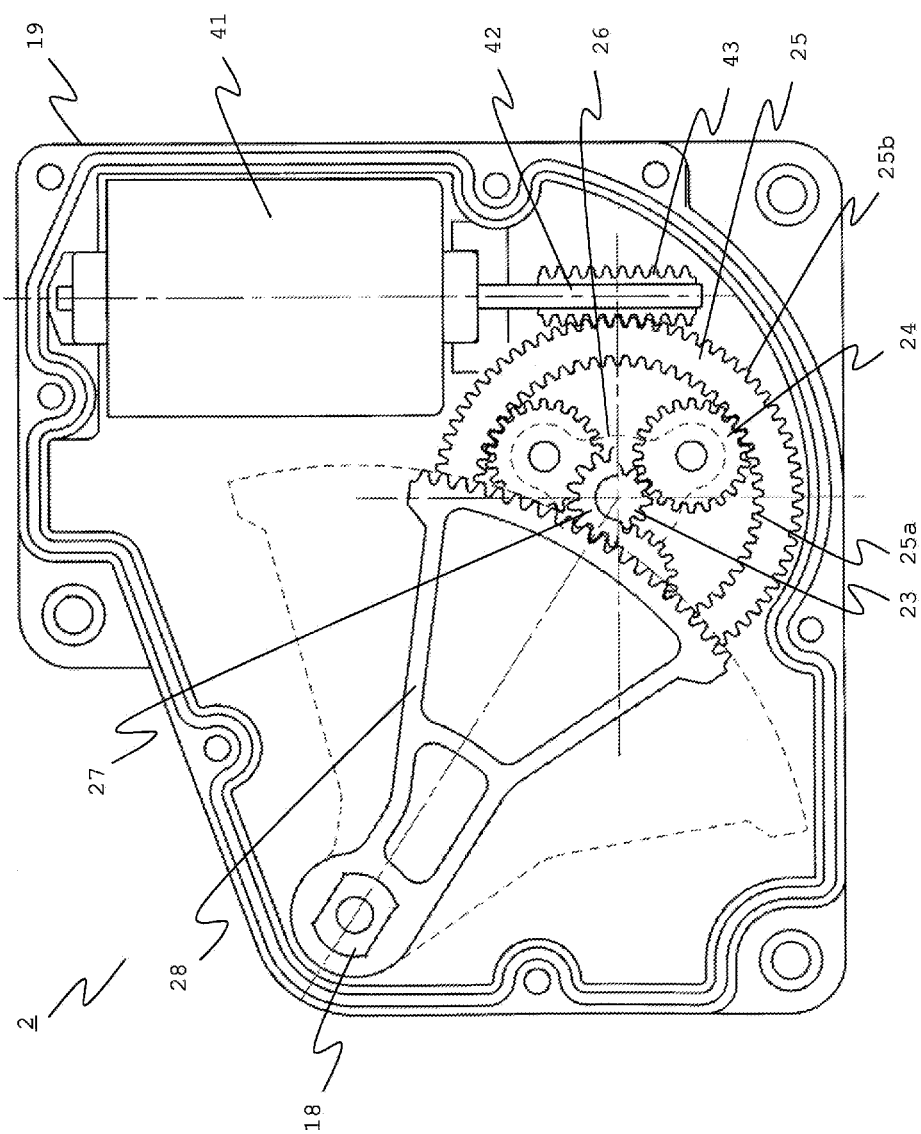
FIG. 3 is a perspective plan view of the range change device according to the embodiment 1.

FIG. 1 is a perspective view illustrating a configuration of the entirety of a shift range changing system including a range change device according to an embodiment 1, FIG. 2 is a lateral cross-sectional view of the range change device, and FIG. 3 is a perspective plan view of the range change device.

First, the configuration of the entirety of the shift range changing system including the range change device according to the embodiment 1 will be described with reference to FIG. 1. A shift range changing system 1 is configured to have a range change device 2, a detent mechanism 3, a parking mechanism 4, and a valve body 5.

In this case, the range change device 2 is configured to be installed in, for example, an automatic transmission mounted on a vehicle. Furthermore, the range change device 2 includes a connector 2a which receives a shift signal (in other words, an electric signal) from a shift lever (in other words, range selecting means) of which the position is selected by a driver of a vehicle. The range change device 2 drives to rotate a shift shaft 6 which is a drive target and is connected to an output shaft 18 described below, in accordance with the shift signal, in such a manner that the range change device 2 causes a detent plate 7 to rotate in a forward direction or a reverse direction. The detent plate 7 is mounted on the shift shaft 6 and has a substantially fan shape. A spool valve 8 is mounted on the detent plate 7, in a state where the spool valve 8 is connected to the detent plate 7. When the detent plate 7 rotates in accordance with the rotation of the shift shaft 6, the spool valve 8 moving in conjunction with the detent plate 7 reciprocatively moves in the valve body 5. Accordingly, an oil path in the valve body 5 is changed, in such a manner that a shift range is set to a predetermined shift range (P, R, N, or D).

In the detent plate 7, a plurality of concave portions 7a are provided in a tip end portion having a substantially fan shape. The concave portions 7a respectively correspond to the range positions (P, R, N, and D) of the spool valve 8. Furthermore, a detent spring 9 fixed to the valve body 5 functions as a plate spring and the tip end of the detent spring 9 is pressed to the concave portions 7a, in such a manner that the detent plate 7 is positioned and held.

Meanwhile, the parking mechanism 4 has a parking rod 10, a conic portion 11, a parking pawl 12, and a parking gear 13. The parking rod 10 is connected to the detent plate 7. The conic portion 11 is provided in the tip end of the parking rod 10. In the parking rod 10, the position of the parking rod 10 is changed in accordance with rotational movement of the detent plate 7 in a forward direction or a reverse direction, in such a manner that the parking pawl 12 performs a seesaw movement in a vertical direction with a shaft 12a as a center via the conic portion 11 in the tip end of the parking rod 10. A convex portion 12b of the parking pawl 12 is fitted to a concave portion 13a of the parking gear 13 or is separated from the concave portion 13a, in accordance with the movement, in such a manner that locking or unlocking of the parking mechanism 4 is operated. As a result, it is possible to prevent or allow rotation of a central output shaft of the parking gear 13 in an automatic transmission.

In the shift range changing system 1, the shift shaft 6 moves in conjunction with the spool valve 8 via the detent plate 7, as described above. Thus, a rotation angle of the shift shaft 6 is controlled, in such a manner that the position of the spool valve 8 is controlled. As a result, the shift range can be set to a predetermined shift range.

Next, details of the configuration and the operation of the range change device 2 which is a principal portion of the present invention will be described with reference to FIGS. 2 and 3. In FIG. 2, the range change device 2 includes a control substrate 14, a main motor 15, an auxiliary motor 41, a speed reduction mechanism 16, and a range changing portion 17. The control substrate 14 generates a control signal in accordance with the shift signal from the shift lever. The main motor 15 is controlled in accordance with the control signal from the control substrate 14. The speed reduction mechanism 16 is connected to the main motor 15. The range changing portion 17 causes the shift shaft 6 connected to the speed reduction mechanism 16 to rotate, in such a manner that the range changing portion 17 performs a change in the shift range. Furthermore, the speed reduction mechanism 16 is also connected to the auxiliary motor 41.

In this case, the output shaft 18 of the range changing portion 17 is rotationally held in a support cylinder portion 19a of a front body 19 constituting a housing of the range change device 2, via a metal bearing 20 provided in the support cylinder portion 19a. In addition, a concave portion 18a is provided in a front-side outer circumferential portion of the output shaft 18. The output shaft 18 is held in an air-tight state or a liquid-tight state with respect to the outside, through a sealing member 21 which is interposed between the concave portion 18a and the front body 19.

The speed reduction mechanism 16 is configured to have a planetary gear speed reduction mechanism and a spur gear speed reduction mechanism. The speed reduction mechanism 16 has a sun gear 23, a planetary gear 24, and internal teeth 25a. The sun gear 23 is mounted on a motor shaft 22 which rotates. The planetary gear 24 is engaged with the sun gear 23. The internal teeth 25a are engaged with the planetary gear 24. The speed reduction mechanism 16 further includes an annular gear 25, a carrier 26, a small gear 27, and a large gear 28. The annular gear 25 has external teeth 25b engaged with an auxiliary gear 43 which is mounted on a motor shaft 42 of the auxiliary motor 41. The carrier 26 supports the planetary gear 24, in a state where the planetary gear 24 can rotate and revolve. The small gear 27 is mounted on the carrier 26 on the surface side opposite to the planetary gear 24. The large gear 28 is fixed to the output shaft 18 and is engaged with the small gear 27. In this case, the auxiliary gear 43 mounted on the motor shaft 42 of the auxiliary motor 41 is a worm gear. The external teeth 25b of the annular gear 25 form a worm wheel.

Furthermore, the carrier 26 is held in a state where the carrier 26 is rotationally slid on the external circumference of the motor shaft 22 extending to the planetary gear 24. In addition, the annular gear 25 is rotationally held by a third rolling bearing 35, in a state where the annular gear 25 is located coaxially with a center axis of the main motor 15.

The main motor 15 is a brushless motor using a permanent magnet. The main motor 15 is configured to have a rotor 30 and a stator 31. The rotor 30 is rotationally supported. The stator 31 is located coaxially with a rotation center of the rotor 30. The rotor 30 is press-fitted to the motor shaft 22. A magnet 32 is fixed to the inner portion of the rotor 30, using means for, for example, adhesion. In addition, the motor shaft 22 is rotationally held in a rear body 36, through a first rolling bearing 33 and a second rolling bearing 34. Furthermore, the rear body 36 and the front body 19 constitute the housing of the range change device 2. The output shaft 18 of the range changing portion 17 and the axis center of the motor shaft 22 are located away from each other, and thus the small gear 27 and the large gear 28 can be disposed.

The control substrate 14 is fixed to the rear body 36. One surface of the control substrate 14 is disposed facing the output shaft 18 of the range changing portion 17. The other surface of the control substrate 14 is disposed at a position facing the rotor 30 of the main motor 15.

Furthermore, a range change position detection sensor 37 which detects the rotation angle of the output shaft 18 is mounted on the control substrate 14, at a position facing the output shaft 18. In other words, the range change position detection sensor 37 is configured to have a magnetic flux orientation detection type magnetic sensor. In the control substrate 14, the range change position detection sensor 37 is disposed at a position facing a magnet 38 embedded in the output shaft 18, in the axis of the output shaft 18. The range change position detection sensor 37 detects the rotation position by detecting change in magnetic flux of the magnet 38 due to rotation of the output shaft 18.

Furthermore, the stator 31 is configured to have a stator core 39 and a coil 40. The stator core 39 forms a plurality of stator teeth extending in a radially inward direction. The coils 40 are connected in three phases of a U phase, a V phase, and a W phase, each of which is wound around each stator tooth.

In the range change device of the embodiment 1, which is configured as described above, the torque generated in the main motor 15 is reduced by the sun gear 23, the planetary gear 24, the annular gear 25, and the carrier 26, and then the torque is transmitted to the small gear 27. The torque transmitted to the small gear 27 is reduced by the large gear 28 engaged with the small gear 27, and then the torque is transmitted to the output shaft 18. When the shift range is changed by the main motor 15, the worm gear 43 connected to the auxiliary motor 41 is subjected to self-locking, in such a manner that the annular gear 25 is prevented from rotating. As a result, the auxiliary motor 41 is prevented from becoming a load of the main motor 15.

Next, an operation for changing the shift range by the auxiliary motor 41 will be described. When it is determined that a shift-range change by the main motor 15 cannot be performed due to, for example, a reduction in voltage supplied to the range change device 2, a shift-range change by the main motor 15 is switched to a shift-range change by the auxiliary motor 41. In this case, at least any one phase of the phases of the coil 40 of the main motor 15 is subjected to excitation, the motor shaft 22 of the main motor 15 is prevented from rotating and, further, power is supplied to the auxiliary motor 41. Here, the excitation in relation to the main motor 15 is DC excitation. Excitation with respect to the main motor 15 is started, and then power supply with respect to the auxiliary motor 41 is started. Accordingly, the coil 40 of the main motor 15 is subjected to excitation, and thus the motor shaft 22 moves to a fixed position corresponding to the excitation. Then, the rotation of the motor shaft 22 is prevented and rotation of the annular gear 25 by the auxiliary motor 41 is performed.

Accordingly, when the annular gear 25 is rotated by the auxiliary motor 41, rotation of the planetary gear 24 is prevented by the motor shaft 22 of the main motor 15, which is prevented from rotating. Therefore, the rotation of the annular gear 25 is transmitted to the carrier 26, and thus the large gear 28 is driven. As a result, a shift-range change by the auxiliary motor 41 can be performed.

The main motor 15 requires responsiveness at large torque, and thus a large current type motor is used as the main motor 15. However, when the supply voltage is equal to or less than a normal operation voltage, it is not possible to drive the main motor 15. In contrast, a motor which has responsiveness inferior to that of the main motor 15 and can be driven even by voltage lower than operation voltage of the main motor 15 is used as the auxiliary motor 41.

Furthermore, power may be supplied from a battery of a vehicle to the auxiliary motor 41 through a switch, such as a relay.

Furthermore, when it is determined that a shift-range change by the main motor 15 can be performed after the supply voltage is recovered to a normal state, the power supply to the auxiliary motor 41 is stopped. Accordingly, the rotation of the annular gear 25 is prevented again. Furthermore, the range position at which a shift-range change is performed by the auxiliary motor 41 can be switched to a range position at which a shift-range change is performed by the main motor 15.

According to the range change device of the embodiment 1, the auxiliary motor is provided as described above. Accordingly, the following effects can be obtained. First, when supply voltage is reduced and it is difficult to perform a shift-range change by the main motor, one phase of the coil of the main motor is subjected to excitation and the auxiliary motor is driven, in such a manner that a shift-range change can be performed. In addition, when the supply voltage is recovered, the shift-range change by the auxiliary motor can return to the normal shift-range change by the main motor.

Embodiment 2

Figure 4:
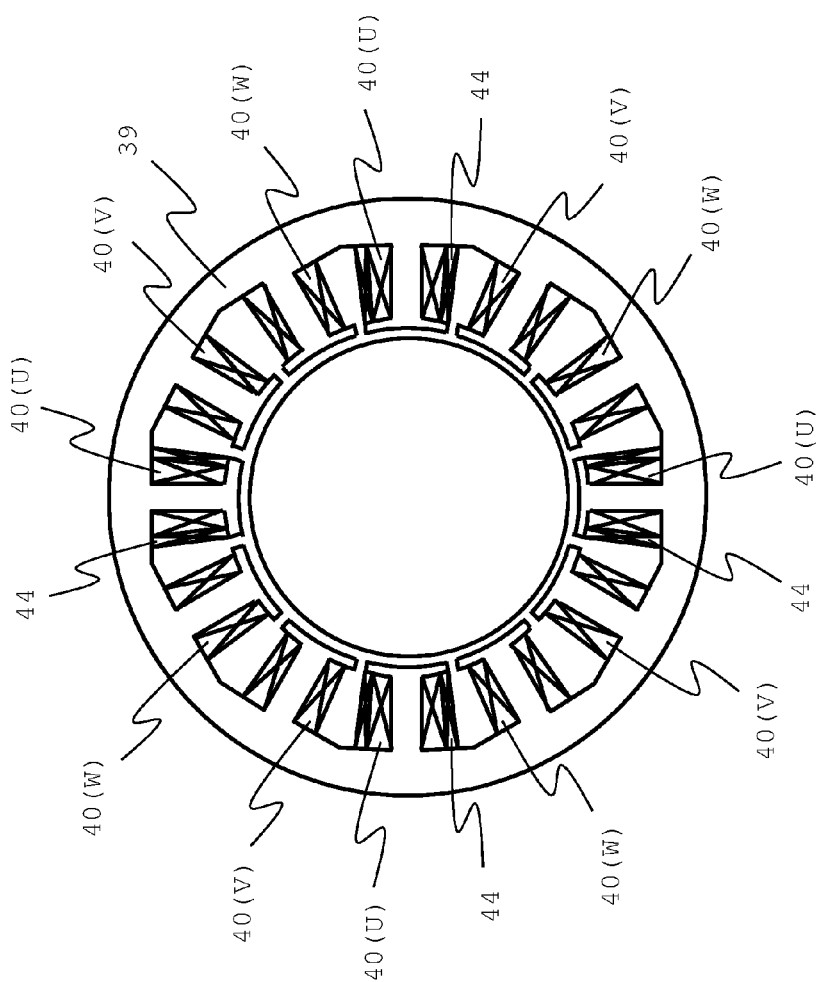
FIG. 4 is a view illustrating a configuration of a coil portion of a main motor in a range change device according to an embodiment 2.

FIG. 4 is a view illustrating a configuration of a coil portion of a main motor in a range change device according to an embodiment 2. A difference between the range change device of the embodiment 1 and the range change device of the embodiment 2 is the configuration of the coil portion of the main motor. Other configurations of the range change device of the embodiment 2 are the same as that of the embodiment 1. The description thereof will not be repeated.

A coil 44 different from the coil 40 for rotationally driving the main motor 15 is provided in a slot of the main motor 15, which is the slot of the stator 31 of at least one phase. The coil 44 receives power through the common power supply system shared by the auxiliary motor 41. Excitation of the coil 44 is started, and then power supply to the auxiliary motor 41 is started.

According to the embodiment described above, the power supply system in relation to the main motor 15 and the power supply system in relation to the auxiliary motor 41 are separated from each other. Thus, even when the power supply system in relation to the main motor 15 does not function due to some failure, such as disconnection in the coil of the main motor 15, the coil 44 of which the common power supply system is shared by the auxiliary motor 41 is subjected to excitation, in such a manner that rotation of the motor shaft 22 of the main motor 15 is prevented. As a result, a shift-range change by the auxiliary motor 41 can be performed.

Furthermore, the power supply system in relation to the coil 44 and the auxiliary motor 41 are different from the power supply system in relation to the main motor 15, and thus a shift-range change can be performed without being influenced by a type of failure generated in the main motor 15.

In the description of the embodiment 2, the coil 44 is wound around the stator core 39 of the main motor 15, in a state where the coil 44 overlaps a coil of one phase. However, the configuration is not limited thereto. The coil 44 may be wound over the coil of any two phases. The effect of the present invention can be obtained as long as the configuration in which rotation of the motor shaft 22 is prevented is adopted.

According to the range change device of the embodiment 2, the auxiliary motor is provided as described above. Accordingly, the following effects can be obtained. First, when it is difficult to perform a shift-range change by the main motor due to a power supply stop or a reduction in supply voltage, a coil for excitation which is provided in the main motor, in addition to a coil for a normal purpose is subjected to excitation, and the auxiliary motor is driven, in such a manner that a shift-range change can be performed. In addition, when the supply voltage is recovered, the shift-range change by the auxiliary motor can return to the normal shift-range change by the main motor.

In the description of the embodiments, a shift-range change at the time of a reduction in supply voltage is performed by a motor. However, the configuration is not limited thereto. A shift-range change at the time of a reduction in supply voltage may be performed by an electromagnetic solenoid which performs a rotational operation as output.

Various modifications and alterations of this invention will be apparent to those skilled in the art without departing from the scope and spirit of this invention, and it should be understand that this is not limited to the illustrative embodiments set forth herein.

What is claimed is:

1. A range change device comprising:
    a main motor and an auxiliary motor;
    a sun gear which is joined to a motor shaft of the main motor;
    an auxiliary gear which is joined to a motor shaft of the auxiliary motor;
    a plurality of planetary gears which are engaged with the sun gear and are arranged on a circumference of the sun gear at equal intervals;
    an annular gear in which internal teeth engaged with the planetary gears and external teeth engaged with the auxiliary gear are formed;
    a carrier which supports the planetary gears in a state where the carrier allows the planetary gears to rotate and revolve and is held in a state where the carrier is rotationally slid on an external circumference of the motor shaft of the main motor;
    a small gear which is mounted on the carrier on a surface opposite to a surface on which the planetary gears are mounted and rotates about an axis of the motor shaft of the main motor; and
    a large gear which is engaged with the small gear,
    wherein a shift range of an automatic transmission is changed by rotation of the large gear.

2. The range change device according to claim 1,
    wherein the auxiliary gear is a worm gear and the external teeth of the annular gear form a worm wheel.

3. The range change device according to claim 1,
    wherein the main motor includes a conductor to perform DC excitation.

4. The range change device according to claim 3,
    wherein a power supply system in relation to the conductor and the auxiliary motor is different from a power supply system in relation to the main motor.

* * * * *